2,709,752

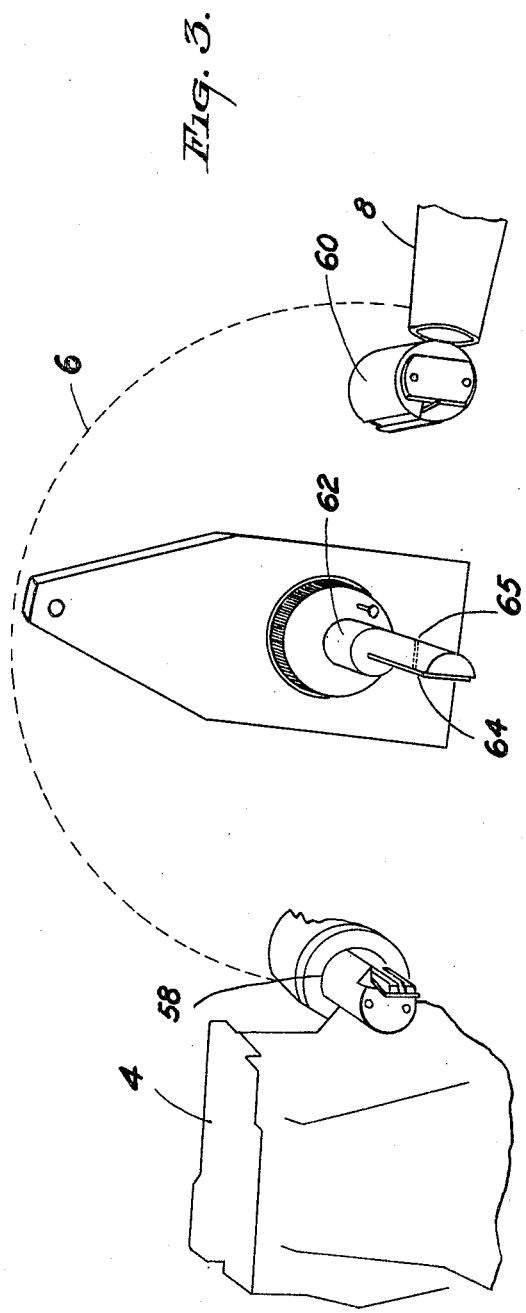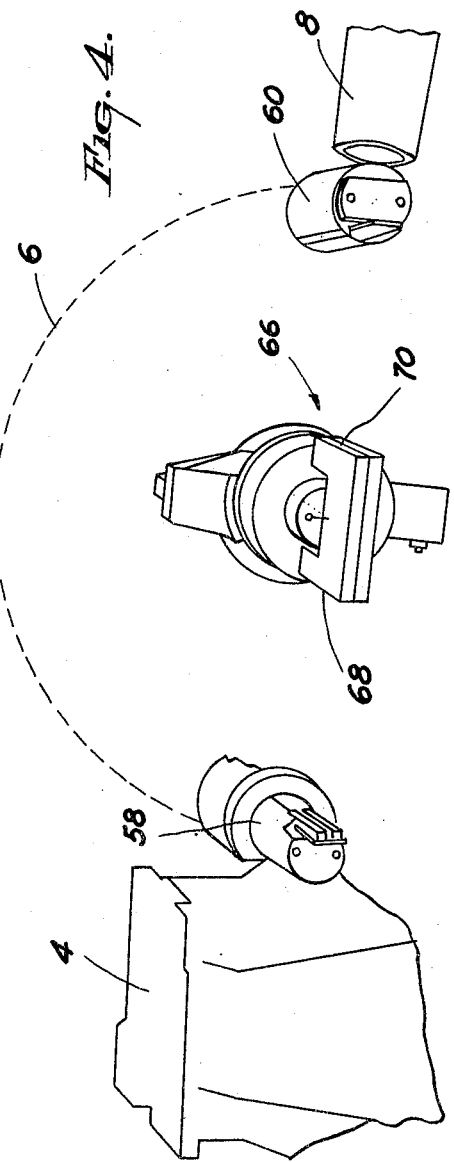

METHOD OF ALIGNING AN X-RAY DIFFRACTION GONIOMETER AND APPARATUS THEREFOR

William Parrish, Hastings, Kurt Lowitzsch, Yonkers, and Edward A. Hamacher, Irvington, N. Y., assignors, by mesne assignments, to North American Philips Company, Inc., New York, N. Y., a corporation of Delaware Application January 18, 1954, Serial No. 404,518

9 Claims. (Cl. 250—52)

This invention relates to a method of alignment of an X-ray diffraction goniometer and to an assembly of alignment fixtures for accomplishing said method.

In order to achieve high precision and resolution with an X-ray diffraction goniometer of the type herein contemplated wherein a flat specimen is irradiated by a beam of X-rays, the goniometer must be aligned correctly. This invention provides a method and apparatus for a more accurate mechanical alignment of a goniometer than has been heretofore known. Thus, by utilizing the method and apparatus disclosed by the present invention the goniometer may be rapidly and accurately positioned with respect to the X-ray tube target and focal spot. The present method further consists of obtaining the absolute zero position and to adjust the angular scale of the X-ray goniometer to correspond precisely to zero degrees $2\theta$, where $\theta$ is the Bragg angle and setting the surface of the flat specimen so that it interrupts the direct X-ray beam at an angle $\theta$.

A further object is to provide an X-ray goniometer alignment method which is faster and more accurate than previously known methods.

The above and other features, objects and advantages of the present invention will be fully understood from the following description considered in connection with the accompanying illustrative drawings.

Fig. 3 is a perspective view of the alignment gauge and associated elements therewith, and Fig. 4 is a perspective view of the 2:1 setting gauge and co-acting elements therewith.

Figure 1:
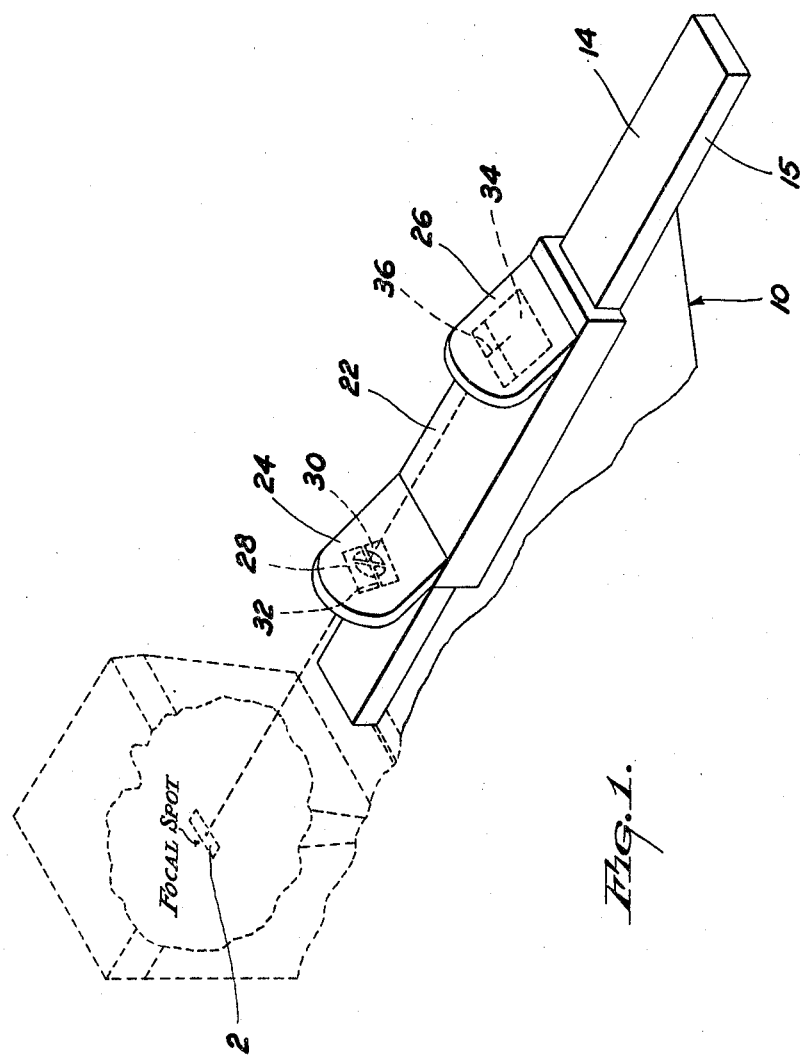
Fig. 1 is a partial perspective view of some of the alignment fixtures and associated structure embodying the present invention.
Figure 2:
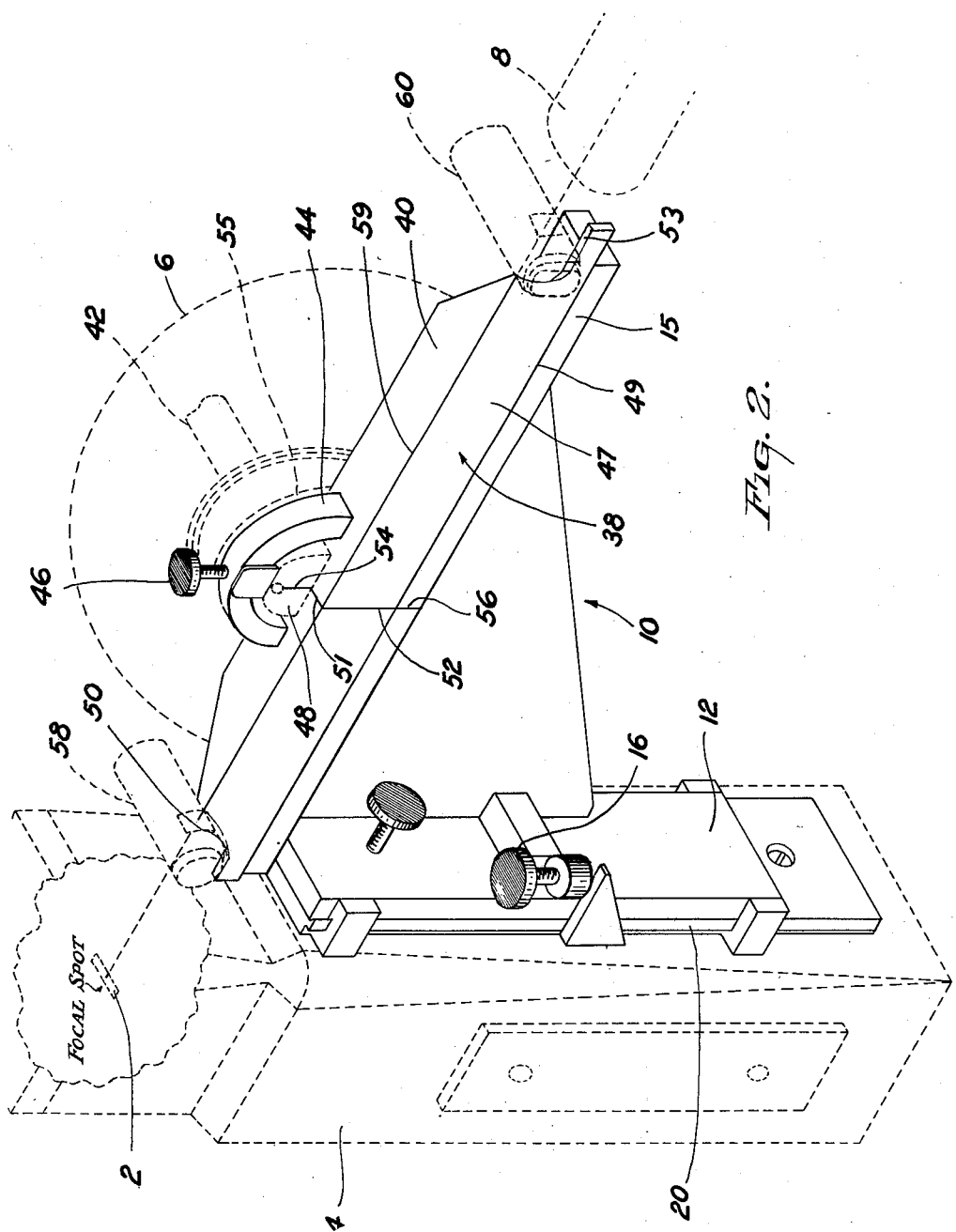
Fig. 2 is a perspective view of other of the alignment fixtures and the device co-operating therewith in accordance with the present invention.

Referring more particularly to the drawings and especially to Figs. 1 and 2, the present method utilizes an X-ray tube 2 in a tube tower 4, an X-ray goniometer 6 and a detector which in this particular instance is Geiger-Müller tube 8. The method embodying the present invention is accomplished by means of a goniometer alignment fixture assembly. This assembly comprises an angle bracket referred to generally by the numeral 10 and which is provided with a vertical support 12 and an alignment surface 14 being preferably at an 87° angle to said vertical support 12. The alignment surface 14 is provided with a side edge 15. The vertical height of angle bracket 10 is controlled by means of an adjusting screw 16, while the alignment surface 14 is machined in this particular instance at precisely 3° to the X-ray target. Angle bracket 10 may be locked in its setting by means of set screw 18. It should be noted that the X-ray tube tower 4 has a vertical side 20 which is a precise reference surface to the X-ray tube focal spot and forms an abutting surface for vertical support 12 of the angle bracket 10 as is clearly shown in Fig. 2.

In order to determine the take-off or viewing angle which is preferably 3° and which has its apex on the focal spot and one leg of the angle formed by the X-ray target shadow and the other leg of the angle passing through the goniometer axis of rotation a fixture 22 is utilized (Fig. 1). Fixture 22 has a pair of spaced, upstanding ears 24 and 26. Ear 24 is provided with a slit opening 32 which is spaced a predetermined distance above alignment surface 14. Ear 26, on the other hand, is provided with a fluorescent screen 34 with a cross-hair 36 scribed thereon in a predetermined location which is spaced above the alignment surface 14 the same distance as slit opening 32 so that the angle bracket 10 may be adjusted in a vertical plane until the X-ray beam passes through the aperture 32 and strikes the fluorescent screen precisely on the cross-hair 36. When this is accomplished the alignment surface 14 of the angle bracket 10 is precisely 3° and the X-ray beam is exactly parallel to the alignment surface 14 and at a known distance therefrom.

Fixture 22 is then removed and replaced with an alignment bar 38.

The alignment bar 38 is L-shaped in cross-section and has a top surface 40 which is placed on the specimen post 42. Alignment bar 38 is further provided with a preferably U-shaped bracket 44 having a thumb screw 46. Bracket 44 is then placed over semi-cylindrical portion 48 of the specimen post 42. The bar 38 is also provided with a side surface 47, a bottom edge 49, and precise cut-out portions 50 and 53 on either end of the side surface 47, the function of which will be hereinafter set forth. A guide line 51—52 is etched or engraved in alignment bar 38 on surfaces 47 and 40 while a vertical line 54 appears on the front face of the semi-cylindrical portion 48 of the specimen post 42. Another line 56 is etched in a vertical side of alignment surface 14.

In order to position alignment bar 38 on the goniometer guide line 51 should be in alignment with vertical line 54. A portion of alignment bar 38 should be pushed into engagement with flat vertical surface 55 of the specimen post 42. The alignment bar 38 is then locked with thumb screw 46. The alignment bar 38 is thereafter rotated in a counter-clockwise direction until cut-out portion 50 is positioned in abutting relationship to slit housing 58. Slit housing 60 is then lowered to abut against cut-out portion 53. The goniometer is moved and manipulated until side surface 47 is in alignment with side edge 15 of the alignment surface 14 to insure the perpendicular and parallel alignment of the focal spot to specimen axis of rotation, and guide line 52 is placed in alignment with line 56 thereby setting the proper distance of the focal spot to the axis of rotation of the goniometer. The X-ray diffraction goniometer is now aligned to the correct relationships, thus, the center of the long axis of the divergence slit, the center of the long axis of the receiving slit and the top surface of the specimen area and the long axis of the focal spot fall in one plane which is perpendicular to the axis of scanning and this plane at the same time bisects the long axis of the focal spot. Moreover, the goniometer has now been aligned to the proper scanning radius and to the proper angle of view.

The goniometer having been aligned the next step in our novel method consists of adjusting the precise zero position of the angular scale of the X-ray goniometer to correspond precisely to zero degrees $2\theta$, where $\theta$ is the Bragg angle. The foregoing is accomplished by replacing the specimen holder 42 in the bushing of a goniometer with an alignment gauge 62 as seen in Fig. 3 with its flat side 64 disposed vertically and perpendicular to the direction of the X-ray beam. By careful manipulation of the alignment gauge 62 and slight readjustment of the Geiger counter tube arm with X-rays penetrating through slit 65 and a correspondingly small receiving slit housing 60 a highest intensity reading is obtained. This position corresponds to the center of the direct beam which is equivalent to 2θ=0 and a goniometer dial (not shown) should be adjusted accordingly to zero degree 2θ.

The 2:1 relationship of the specimen surface to the receiving slit is next achieved. This, of course, involves the setting of the surface of the flat specimen so that it is positioned in the center of the direct X-ray beam at an angle θ. In order to accomplish the foregoing the alignment or zero setting gauge 62 is replaced by the specimen holder 42 and the 2:1 setting gauge 66 as illustrated in Fig. 4 is placed in the specimen holder 42. The gauge 66 consists of two slits or pinholes 68 and 70 spaced equidistant from the axis of rotation and such that a straight line connecting the two centers of the slits 68 and 70 passes through athe axis of rotation. The gauge 66 is rotated until a maximum of X-ray radiation passes through the slits while the goniometer is set at 2θ=0. When this is accomplished the mounting surface for the flat specimen is set automatically at an angle θ which is one-half of the angle 2θ. This adjustment is, of course, the 2:1 setting.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What we claim is:

1. A method of aligning an X-ray diffraction goniometer having a divergence slit and a receiving slit comprising setting an X-ray beam to a predetermined angle of view consisting of an angle with its apex being on the focal spot of the X-ray tube, one leg formed by the X-ray target shadow and the other leg passing through the axis of rotation of the goniometer, further adjusting said goniometer so that the center of the long axis of the divergence slit, the center of the long axis of the receiving slit, the top surface of the specimen area, and the long axis of the focal spot fall in one plane which is perpendicular to the axis of scanning, said plane bisecting the long axis of the focal spot, and positioning the correct scanning radius in relation to the focal spot of the X-ray tube.

2. A method of aligning an X-ray diffraction goniometer having a divergence slit and a receiving slit comprising setting an X-ray beam to a predetermined angle of view consisting of an angle with its apex being on the focal spot of the X-ray tube, one leg formed by the X-ray target shadow and the other leg passing through the axis of rotation of the goniometer, further adjusting said goniometer so that the center of the long axis of the divergence slit, the center of the long axis of the receiving slit, the top surface of the specimen area, and the long axis of the focal spot fall in one plane which is perpendicular to the axis of scanning, said plane bisecting the long axis of the focal spot, positioning the correct scanning radius in relation to the focal spot of the X-ray tube, adjusting the zero position of the angular scale of said goniometer to correspond to zero degree 2θ, where θ is the Bragg angle, and setting the mounting surface of the said specimen so that it interrupts the direct beam at an angle θ.

3. A method of aligning an X-ray diffraction goniometer having a divergence slit and a receiving slit comprising the steps of projecting an X-ray beam through a slit and impinging said beam on a cross-hair of a fluorescent screen mounted on a predetermined angular reference surface to thereby establish the correct angle of view, further adjusting said goniometer so that the center of the long axis of the divergence slit, the top surface of the specimen area and the long axis of the focal spot fall in one plane which is perpendicular to the axis of scanning, said plane bisecting the long axis of the focal spot, and positioning the correct scanning radius in relation to the focal spot of the X-ray tube.

4. A method of aligning an X-ray diffraction goniometer having a divergence slit and a receiving slit comprising the steps of projecting an X-ray beam through a slit and impinging said beam on a cross-hair of a fluorescent screen mounted on a predetermined angular reference surface to thereby establish the correct angle of view, placing an alignment bar on said angular reference surface, sighting said beam along an edge of said alignment bar so that the center of the long axis of the divergence slit, the center of the long axis of the receiving slit, the top surface of the specimen area, and the long axis of the focal spot fall in one plane which is perpendicular to the axis of scanning, said plane bisecting the long axis of the focal spot, and positioning the correct scanning radius in relation to the focal spot of the X-ray tube.

5. A method of aligning an X-ray diffraction goniometer having a divergence slit and a receiving slit comprising setting an X-ray beam to a predetermined angle of view consisting of an angle with its apex being on the focal spot of the X-ray tube, one leg formed by the X-ray target shadow and the other leg passing through the axis of rotation of the goniometer, further adjusting said goniometer so that the center of the long axis of the divergence slit, the center of the long axis of the receiving slit, the top surface of the specimen area, and the long axis of the focal spot fall in one plane which is perpendicular to the axis of scanning, said plane bisecting the long axis of the focal spot, positioning the correct scanning radius in relation to the focal spot of the X-ray tube, passing said X-ray beam through a slit on the axis of rotation for maximum radiation therethrough in order to adjust the zero position of the angular scale of the X-ray goniometer to correspond to zero degree 2θ, where θ is the Bragg angle, and setting the mounting surface of the said specimen so that it interrupts the direct beam at an angle θ.

6. A method of aligning an X-ray diffraction goniometer having a divergence slit and a receiving slit comprising setting an X-ray beam to a predetermined angle of view consisting of an angle with its apex being on the focal spot of the X-ray tube, one leg formed by the X-ray target shadow and the other leg passing through the axis of rotation of the goniometer, placing an alignment bar on a predetermined angular reference surface, sighting said X-ray beam along an edge of said alignment bar so that the center of the long axis of the divergence slit, the center of the long axis of the receiving slit, the top surface of the specimen area, and the long axis of the focal spot fall in one plane which is perpendicular to the axis of scanning, and positioning the correct scanning radius in relation to the focal spot of the X-ray tube.

7. A method of aligning an X-ray diffraction goniometer having a divergence slit and a receiving slit comprising setting an X-ray beam to a predetermined angle of view consisting of an angle with its apex being on the focal spot of the X-ray tube, one leg formed by the X-ray target shadow and the other leg passing through the axis of rotation of the goniometer, further adjusting said goniometer so that the center of the long axis of the divergence slit, the center of the long axis of the receiving slit, the top surface of the specimen area, and the long axis of the focal spot fall in one plane which is perpendicular to the axis of scanning, said plane bisecting the long axis of the focal spot, positioning the correct scanning radius in relation to the focal spot of the X-ray tube, passing said X-ray beam through a slit on the axis of rotation for maximum radiation therethrough in order to adjust the zero position of the angular scale of the X-ray goniometer to correspond to zero degree 2θ, where θ is the Bragg angle, and projecting said X-ray beam through a pair of slits spaced equidistant from the axis of rotation, rotating said slits until a maximum of radiation passes therethrough while the goniometer is set at 2θ=0 thereby setting the mounting surface of said specimen so that it interrupts the direct beam at an angle θ.

8. A combination of alignment fixtures for an X-ray diffraction goniometer having an X-ray tube tower, a divergence slit, a receiving slit and a specimen between said two slits, comprising an angle bracket having one surface thereof secured to a vertical side of said tube tower and another surface of said bracket being at less than 90° angle with said one surface, first means on said other surface of said bracket for setting an X-ray beam to a predetermined angle of view which is parallel to said other surface, and second means for replacing said first means on said other surface to thereby adjust said X-ray beam so that the center of the long axis of the divergence slit, the center of the long axis of the receiving slit, the top surface of the specimen area and the long axis of the focal spot fall in one plane which is perpendicular to the axis of scanning.

9. A combination of alignment fixtures for an X-ray diffraction goniometer having an X-ray tube tower, a divergence slit, a receiving slit and a specimen between said two slits, comprising an angle bracket having one surface thereof secured to a vertical side of said tube tower and another surface of said bracket being at less than 90° angle with said one surface, first means on said other surface of said bracket for setting an X-ray beam to a predetermined angle of view which is parallel to said other surface, second means for replacing said first means on said other surface to thereby adjust said X-ray beam so that the center of the long axis of the divergence slit, the center of the long axis of the receiving slit, the top surface of the specimen area, and the long axis of the focal spot fall in one plane which is perpendicular to the axis of scanning, a device having a slit, means for projecting an X-ray beam through said slit so that the zero position of the angular scale of the X-ray goniometer corresponds to zero degree 2θ, where θ is the Bragg angle, and another device having two slits in spaced position equidistant from the axis of rotation, said X-ray beam being adapted to pass through said two slits while said other device is rotated in order to set the surface of the specimen so that it interrupts said X-ray beam at an angle θ.

References Cited in the file of this patent

UNITED STATES PATENTS

| | | |
|---|---|---|
| 1,589,833 | Behnken et al. | June 22, 1926 |
| 2,449,066 | Friedman | Sept. 14, 1948 |
| 2,452,045 | Friedman | Oct. 26, 1948 |
| 2,514,791 | Parrish et al | July 11, 1950 |
| 2,559,972 | Kirkpatrick | July 10, 1951 |

OTHER REFERENCES

Journal of Scientific Instruments, vol. 18, pages 216–219, 1941.